I. BAXTER.
CLOSURE FOR CANS.
APPLICATION FILED FEB. 29, 1916.
1,198,315.
Patented Sept. 12, 1916.
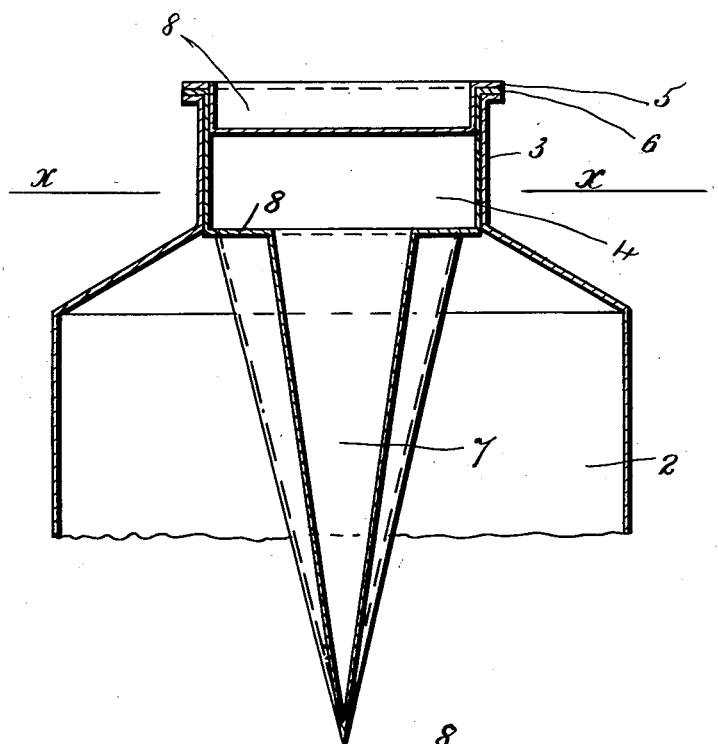
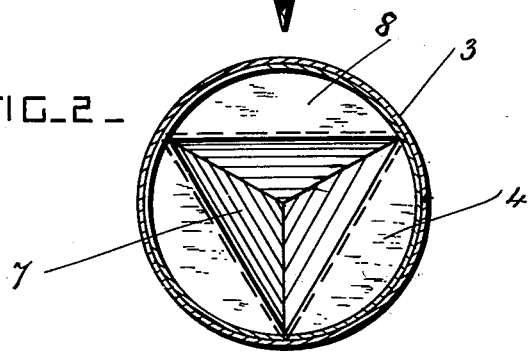

UNITED STATES PATENT OFFICE.

IRA BAXTER, OF GRANVILLE SUMMIT, PENNSYLVANIA.

CLOSURE FOR CANS.

1,198,315.  Specification of Letters Patent.  Patented Sept. 12, 1916.

Application filed February 29, 1916. Serial No. 81,227.

*To all whom it may concern:*

Be it known that I, IRA BAXTER, a citizen of the United States, residing at Granville Summit, in the county of Bradford and State of Pennsylvania, have invented certain new and useful Improvements in Closures for Cans; and I do hereby declare the following to be a full, clear and exact description of the invention, such as will enable other skilled in the art to which it appertains to make and use the same.

This invention relates to cans in which milk is transported; and it consists in a closure for the can having a receptacle for ice, a portion of which receptacle depends within the liquid in the can, and assists in keeping it cool, as hereinafter fully described and claimed.

In the drawings, Figure 1 is a vertical section through the top portion of a milk can provided with a closure according to this invention. Fig. 2 is a cross-section, taken on the line $x$—$x$ in Fig. 1.

The milk can 2 is provided with a cylindrical neck 3 at its upper part, and is otherwise of any approved form and construction. A short cylindrical vessel 4 is slidable like a stopper in the neck 3 of the vessel or can, and has a flange or bead 5 at its top which rests on the flange or bead 6 at the top of the neck. This vessel 4 has a substantially flat bottom 8, which is arranged above the level of the milk in the can, and generally about on a level with the bottom of the cylindrical neck 3.

A relatively long triangular extension 7 projects from the bottom of the cylindrical vessel 4, and forms a continuation of said vessel. This extension 7 projects below the level of the milk in the can, and as much below its normal level or surface as desirable. This extension presents a large cooling surface to the milk but does not displace very much milk when placed in position, so that the milk is not forced out at the top of the neck. A cover 8 of any approved make is provided and fits into the top of the cylindrical vessel 4. The ice is placed in the cylindrical vessel and its triangular extension, and is renewed when melted. The extension 7 is largest at the top and tapers to a point.

What I claim is:

A can for shipping liquid, a main vessel for holding ice which fits in the neck of the can and which has a substantially flat bottom, an extension vessel for holding ice, said extension vessel being formed of three flat triangular sides and tapering to a point at its lower end and having its upper end secured to the bottom of the main vessel with its angles arranged at the periphery of the main vessel, and means for closing the top of the main vessel.

In testimony whereof I have affixed my signature.

IRA BAXTER.